US011351941B1

(12) United States Patent
Maney, Jr. et al.

(10) Patent No.: US 11,351,941 B1
(45) Date of Patent: Jun. 7, 2022

(54) METHOD AND SYSTEM FOR MANAGING CUSTOMIZED VEHICLE SETTINGS ACROSS MULTIPLE VEHICLES

(71) Applicant: UIPCO, LLC, San Antonio, TX (US)

(72) Inventors: Will Kerns Maney, Jr., San Antonio, TX (US); Gregory Brian Meyer, San Antonio, TX (US); Sean Carl Mitchem, San Antonio, TX (US); Ruthie D. Lyle, Durham, NC (US); Deborah Janette Schulz, San Antonio, TX (US); Bryan J. Osterkamp, New Braunfels, TX (US); Timothy Blair Chalmers, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 145 days.

(21) Appl. No.: 16/577,172

(22) Filed: Sep. 20, 2019

Related U.S. Application Data

(60) Provisional application No. 62/783,453, filed on Dec. 21, 2018.

(51) Int. Cl.
*B60R 16/037* (2006.01)
*B60H 1/00* (2006.01)
*B60N 2/02* (2006.01)
*B60R 1/04* (2006.01)
*B60R 1/07* (2006.01)

(52) U.S. Cl.
CPC ....... *B60R 16/037* (2013.01); *B60H 1/00964* (2013.01); *B60N 2/0248* (2013.01); *B60R 1/04* (2013.01); *B60R 1/07* (2013.01)

(58) Field of Classification Search
CPC .......... B60R 16/037; B60R 1/04; B60R 1/07; B60H 1/00964; B60N 2/0248
See application file for complete search history.

(56) References Cited

U.S. PATENT DOCUMENTS

| | | | |
|---|---|---|---|
| 9,104,537 B1 * | 8/2015 | Penilla | B60L 53/305 |
| 9,139,091 B1 * | 9/2015 | Penilla | B60L 1/02 |
| 9,171,268 B1 * | 10/2015 | Penilla | B60L 53/305 |
| 9,229,905 B1 * | 1/2016 | Penilla | H04L 67/306 |
| 9,288,270 B1 * | 3/2016 | Penilla | G06Q 10/02 |
| 9,365,188 B1 * | 6/2016 | Penilla | B60L 53/68 |
| 9,367,217 B2 * | 6/2016 | Moore, Jr. | G06Q 10/02 |
| 9,697,503 B1 * | 7/2017 | Penilla | B60K 35/00 |

(Continued)

*Primary Examiner* — Peter D Nolan
*Assistant Examiner* — Demetra R Smith-Stewart
(74) *Attorney, Agent, or Firm* — Plumsea Law Group, LLC

(57) ABSTRACT

A system and method for managing customized vehicle settings across multiple vehicles is disclosed. The system comprises a vehicle customization platform where a user customization profile with information about customized settings can be transferred to a customization management system within each of multiple vehicles that may be driven by a user with the user customization profile. The customized vehicle settings include seat position settings, horsepower settings, mirror position settings, climate settings, and audio system settings. Upon receiving the user customization profile, a customization management system passes customized settings to different vehicle control systems to automatically set the customized settings.

20 Claims, 8 Drawing Sheets

(56) References Cited

U.S. PATENT DOCUMENTS

| | | | |
|---|---|---|---|
| 2010/0280711 A1* | 11/2010 | Chen | B60R 16/037 |
| | | | 455/41.2 |
| 2013/0204455 A1* | 8/2013 | Chia | G07C 5/0808 |
| | | | 701/1 |
| 2015/0203125 A1* | 7/2015 | Penilla | G07C 5/0808 |
| | | | 701/1 |
| 2015/0210287 A1* | 7/2015 | Penilla | G06F 3/04842 |
| | | | 701/49 |
| 2015/0304406 A1* | 10/2015 | Penilla | B60L 53/65 |
| | | | 709/203 |
| 2016/0046300 A1* | 2/2016 | Wingfield | B60W 50/085 |
| | | | 701/48 |
| 2017/0158023 A1* | 6/2017 | Stevanovic | B60H 1/00771 |
| 2017/0270490 A1* | 9/2017 | Penilla | G06Q 10/06314 |
| 2018/0059913 A1* | 3/2018 | Penilla | B60W 40/08 |
| 2018/0222414 A1* | 8/2018 | Ihlenburg | B60R 16/037 |

\* cited by examiner

METHOD AND SYSTEM FOR MANAGING CUSTOMIZED VEHICLE SETTINGS ACROSS MULTIPLE VEHICLES

CROSS-REFERENCE TO RELATED APPLICATIONS

This application claims the benefit of Provisional Patent Application No. 62/783,453 filed Dec. 21, 2018, and titled "Method and System for Managing Customized Vehicle Settings Across Multiple Vehicles," which is incorporated by reference herein in its entirety.

TECHNICAL FIELD

The present disclosure generally relates to methods and systems for managing customized vehicle settings in vehicles, and in particular, to managing customized vehicle settings across multiple vehicles.

BACKGROUND

Users of motor vehicles often have preferred settings for various vehicle systems and components. For example, users may have preferred seat positions, mirror positions, climate control settings and radio stations. Some vehicles allow users to store settings for some systems in the onboard computer so that the vehicle can "remember" those settings at a later time. However, such systems only apply to a single vehicle, which are generally owned and operated by at most a few users. These systems do not allow users to have customized vehicle settings associated with other vehicles that they may operate temporarily, like rental cars.

There is a need in the art for a system and method that addresses the shortcomings discussed above.

SUMMARY

In one aspect, a vehicle customization platform for controlling a first vehicle setting in a first vehicle and for controlling a second vehicle setting in a second vehicle includes a user customization profile associated with a user. The user customization profile includes information about a customized vehicle setting. The vehicle customization platform also includes a first control system operable to change the first vehicle setting in the first vehicle. The first control system is also operable to receive information about the customized vehicle setting. The vehicle customization platform also includes a second control system that is operable to change the second vehicle setting in the second vehicle. The second control system is also operable to receive information about the customized vehicle setting. When the first control system receives information about the customized vehicle setting, the first control system changes the first vehicle setting from a first initial setting to the customized vehicle setting. When the second control system receives information about the customized vehicle setting, the second control system changes the second vehicle setting from a second initial setting to the customized vehicle setting.

In another aspect, a vehicle customization platform for controlling vehicle settings in a vehicle includes a mobile device for storing a user customization profile, where the user customization profile includes information about at least one customized vehicle setting. The platform also includes a vehicle control system disposed within the vehicle and operable to change the vehicle settings in the vehicle. The platform also includes a customization management system that is operable to receive the user customization profile from the mobile device and send information about the at least one customized vehicle setting to the vehicle control system.

In another aspect, a method of changing vehicle settings in a first vehicle and a second vehicle using a customized vehicle setting associated with a user customization profile is disclosed. The first vehicle includes a first vehicle control system operable to adjust a first vehicle setting in the first vehicle and the second vehicle includes a second vehicle control system operable to adjust a second vehicle setting in the second vehicle. The method includes steps of receiving information about the customized vehicle setting at the first vehicle control system, changing the first vehicle setting to the customized vehicle setting, receiving information about the customized vehicle setting at the second vehicle control system, and changing the second vehicle setting to the customized vehicle setting.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods for managing customized vehicles settings across multiple vehicles. Customized vehicle settings may be any settings associated with one or more vehicle systems. More specifically, customized vehicle settings can be adjusted automatically by one or more onboard systems, without requiring the user to manually adjust the settings.

Customized vehicle settings can be used with one or more motor vehicles. As used herein, the term "motor vehicle," or simply vehicle, refers to any kind of car, van, truck, motorcycle, electric scooter, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

As used herein, the term "user customization profile" refers to information including one or more customized vehicle settings for a specific user. A user customization profile may include customized vehicle settings for multiple vehicle systems, such as customized seat settings, customized engine settings (for example, maximum horsepower settings), customized mirror settings, customized climate settings and customized audio system settings (for example, customized radio channels). Other examples of customizable settings include seat heater settings, navigation/destination settings, and/or brake pedal positions.

In the exemplary systems, user customization profiles can be stored in the cloud and/or on mobile devices such as smart phones, Bluetooth devices, and/or RFID devices. Upon receiving a user customization profile, a vehicle control system can automatically adjust the vehicle settings according to the user customization profile. The system can be implemented in multiple vehicles so that user customization profiles can be used across multiple vehicles. For example, the system could be implemented in customer owned vehicles, rental vehicles, and ride sharing vehicles. This allows each user to bring their customized vehicle settings with them as they change from driving their own vehicle to driving a rental car and/or a ride sharing vehicle.

Figure 1:
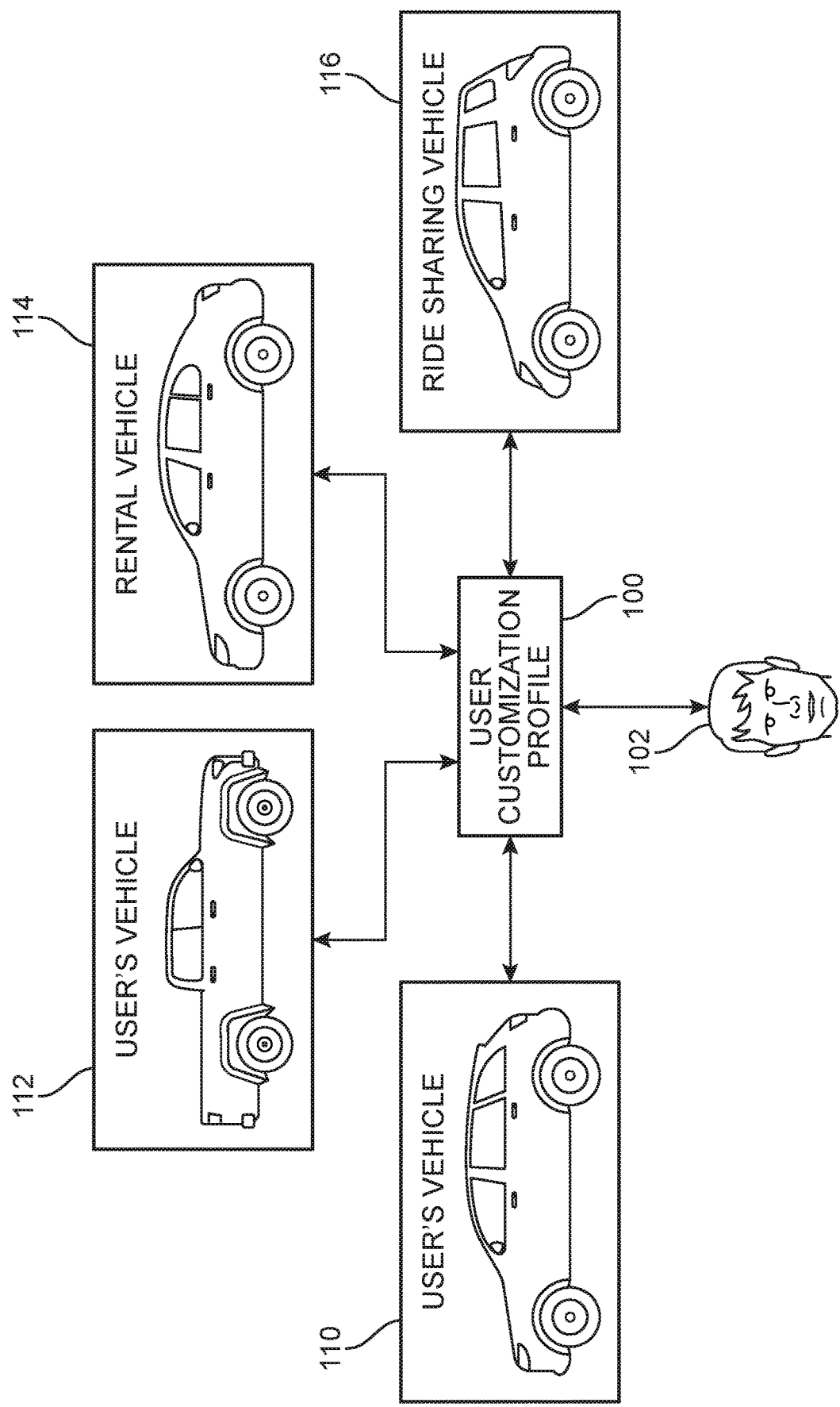
FIG. 1 is a schematic view of a vehicle customization platform, according to an embodiment.

FIG. 1 is a schematic view of a user customization profile 100 that can be used by multiple different vehicles. User customization profile 100 corresponds to a user 102 and includes information about one or more customized vehicle settings.

User customization profile 100 may be received by systems within multiple vehicles that a user may drive (or ride in) at some point. These include a first user vehicle 110, a second user vehicle 112 (i.e., a second car owned and driven by the same user), a rental vehicle 114, and a ride sharing vehicle 116. This example shows how a user customization profile can be used across different vehicles with different use/ownership structures. For example, first user vehicle 110 and second user vehicle 112 may be individually owned (or leased) vehicles. By contrast, rental vehicle 114 may be owned by a corporation (for example, a rental car company). Moreover, ride sharing vehicle 116 could be owned by either individuals participating in a ridesharing network, or a corporation that owns a fleet of vehicles that can be shared among participants in a ride sharing program. Thus, it may be appreciated that the exemplary systems and methods provide a vehicle customization platform that facilitates the transfer and implementation of customized vehicle settings across multiple vehicles and for different users.

Figure 2:
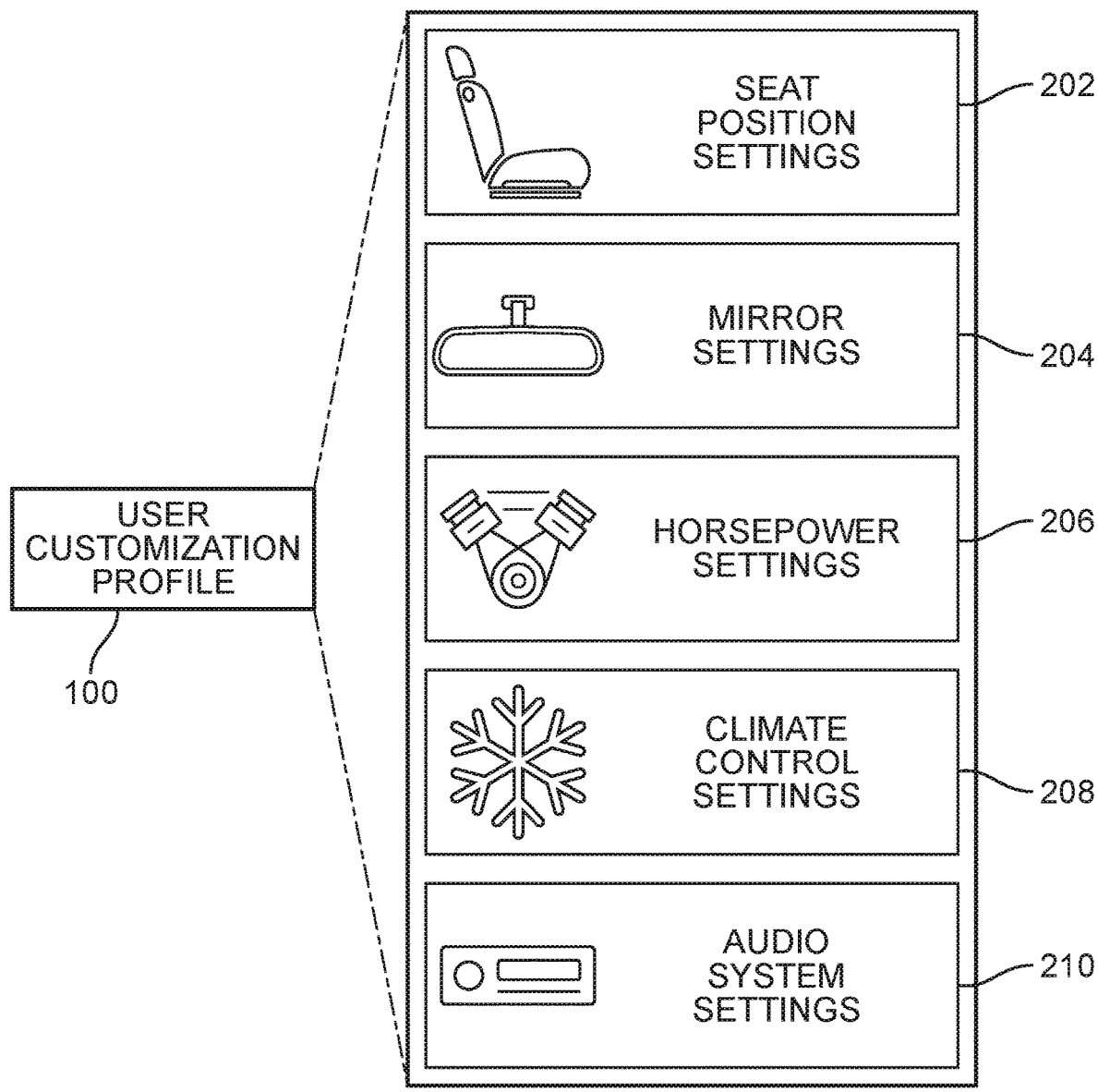
FIG. 2 is a schematic view of a set of customized vehicle settings that may be associated with a user customization profile.

FIG. 2 is a schematic view of a set of exemplary vehicle settings that can comprise part of a user customization profile. Referring to FIG. 2, user customization profile 100 may include seat position settings 202, mirror settings 204, horsepower settings 206, climate control settings 208 and audio system settings 210.

Seat position settings 202 can comprise multiple different settings associated with a vehicle seat's position and/or orientation. These may include, but are not limited to: the forward/rearward position of the seat, the amount by which the back of the seat is reclined, the seat height, the headrest height and/or orientation, the amount by which the lower part of the seat is titled, as well as any other known vehicle seat settings.

Mirror settings 204 can comprise multiple different settings associated with the positions of different mirrors in a vehicle. Exemplary mirrors include, but are not limited to, rearview mirrors, driver side mirrors and passenger side mirrors. Mirror positions can include the degree to which they are angled along multiple different axes.

Horsepower settings 206 can comprise, for example, a maximum horsepower setting. Some vehicles allow users to set a maximum horsepower setting as a safety measure and/or a fuel saving measure.

Climate control settings 208 can comprise, for example, a preferred temperature (or range of temperatures), a preferred fan speed, and air conditioning ON/OFF. Climate control settings 208 can be provided for the whole vehicle, or for segments of the vehicle (such as "front driver side", "front passenger side" and "rear"). In some embodiments, climate control settings can be given for different outdoor conditions. For example, users may have different climate preferences according to the outside temperature, outside humidity, and/or wind conditions. In embodiments with automatically adjustable vent positions, climate control settings could further include vent positions or preferences about which vents should be opened or closed.

Audio system settings 210 can comprise, for example, radio station settings. In some embodiments, for example, audio system settings 210 include a list of a user's preferred radio stations. Upon receiving the user customization profile, an audio system in a vehicle could automatically program pre-set radio stations according to the list of preferred stations. In another embodiment, audio system settings could also include connectivity settings. For example, audio system settings could include information that would allow the audio system in the vehicle to automatically connect to a user's phone without requiring a user to go through a setup process.

Figure 3:
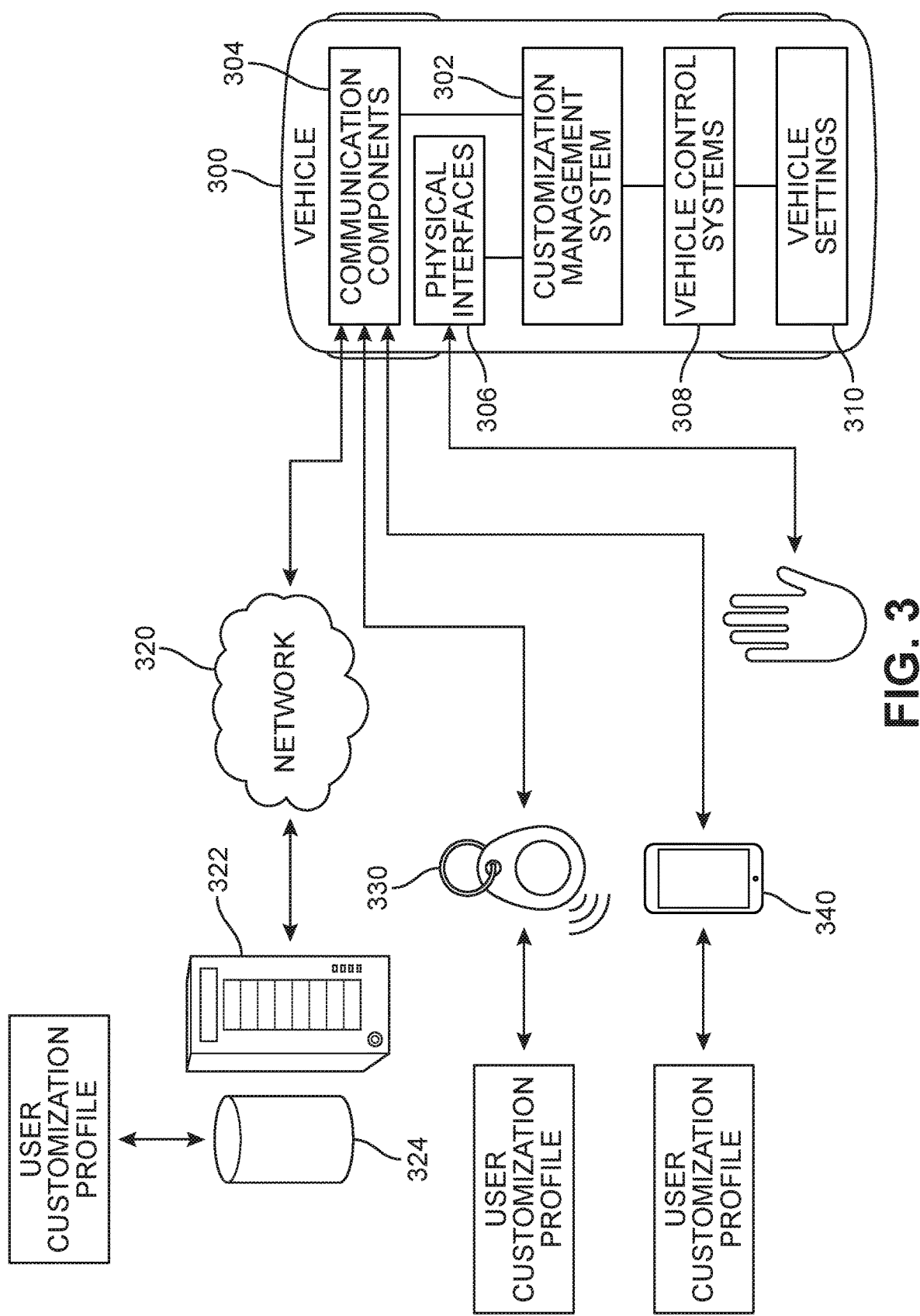
FIG. 3 is a schematic view of a representative vehicle in a vehicle customization platform, according to an embodiment.

FIG. 3 is a schematic view of an exemplary vehicle 300 that comprises part of a vehicle customization platform, according to an embodiment. FIG. 3 is intended to depict an exemplary system for use with one vehicle. It may be appreciated that similar systems and components could be used in multiple different vehicles. This provides a vehicle customization platform where users can have their customized settings implemented across multiple different vehicles to provide a consistent experience regardless of the particular vehicle being used.

Vehicle 300 includes customization management system 302. Customization management system 302 may transmit and receive information through communication components 304 and/or physical interfaces 306. Customization management system 302 may also implement customized vehicle settings by passing information to one or more vehicle control systems 308. Vehicle control systems 308 then act to change vehicle settings 310.

As seen in FIG. 3, a user customization profile can be received from a variety of different sources. In some cases, a user customization profile can be stored on a mobile device. As used herein, the term "mobile device" refers to any device that is not permanently attached to vehicle 300 and can be removed from vehicle 300 in a non-destructive manner. Mobile devices can be carried by users and may store user customization profiles that can be communicated to a vehicle once a user is near or inside the vehicle.

Some embodiments may include a key fob 330, for storing and transmitting a user customization profile. Key fob 330 may be configured to transmit a user customization profile to communication components 304 of vehicle 300. Communication could occur using radio frequency identification (RFID) technology, personal area network technology (such as Bluetooth), near field communication (NFC) technology, WiFi technology or any other known wired or wireless technologies. Alternatively, in other embodiments, a user customization profile could be carried on other mobile devices with transmitting capabilities. For example, in another embodiment, a user could have a credit or bank card with an NFC or RFID chip that can transmit the user customization profile to a corresponding communication component within vehicle 300.

Some embodiments can use a mobile phone 340 (smartphone) for storing and transmitting a user customization profile. Mobile phone 340 may be configured to transmit a user customization profile to communication components 304 of vehicle 300. Communication could occur using personal area network technology (such as Bluetooth), near field communication (NFC) technology, WiFi technology or any other known wired or wireless technologies. Although the embodiments depict a mobile phone, other kinds of mobile computing devices could also be used, including, for example, tablet computers, smart watches, and laptop computers.

In some embodiments, a user customization profile may not be stored on a personal device (such as a key fob or smartphone). Instead, the user customization profile can be retrieved over a network 320. Specifically, the user customization profile can be retrieved from a remote server 322 that can store multiple user customization profiles in database 324.

In some embodiments, network 320 may be a wide area network ("WAN"), e.g., the Internet. In other embodiments, network 320 may be a local area network ("LAN"). For example, in a more remote location far from a metropolitan area, the Internet may not be available. In yet other embodiments, network 320 may be a combination of a WAN and a LAN. Depending on the type of network, a suitable communications component may be used for communication between customization management system 302 and remote server 322.

Figure 4:
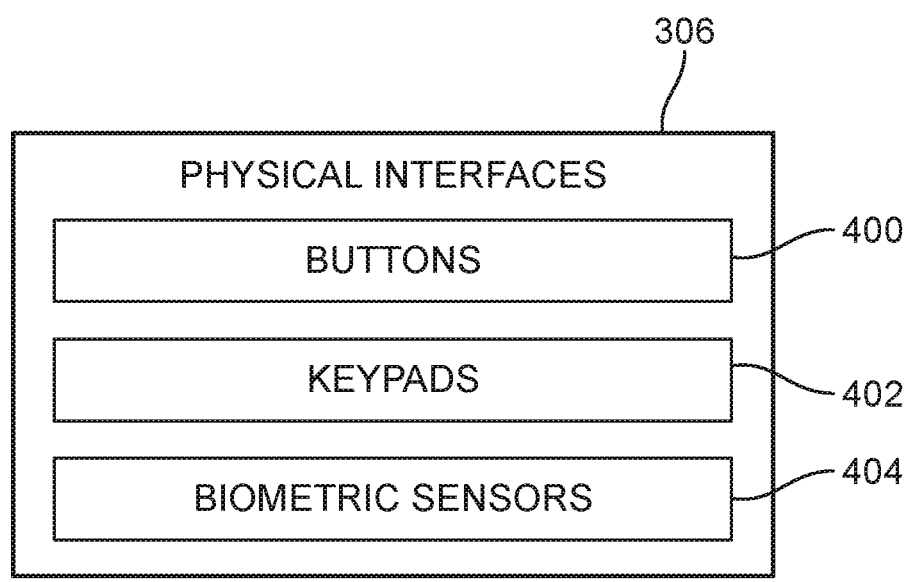
FIG. 4 is a schematic view of a set of physical interfaces, according to an embodiment.

To determine the appropriate user customization profile to retrieve from a remote server, a vehicle can include components that facilitate user identification. In some embodiments, user identification can be accomplished using mobile phone 340. In other embodiments, a vehicle can include one or more physical interfaces 306 that can be used to identify and/or authenticate a user. As seen in FIG. 4, exemplary interfaces that could be used include, but are not limited to: physical buttons 400, keypads 402 (both digital and physical) and biometric sensors 404. Exemplary biometric sensors include fingerprint readers and retina scanners.

In some embodiments, a user customization profile could be associated with a blockchain system that facilitates keeping the user customization profile secure, facilitates transferability, and maintains a log of how the profile has been used. In one embodiment, a user desiring to share their user customization profile with another vehicle could have a locked version of the profile transferred to the new vehicle through a blockchain based system. The profile could then be unlocked using a passcode so that the new vehicle is able to access and use the customized vehicle settings, and also has access to the biometric data (for example, biometric fingerprint templates) that facilitate unlocking, turning on and/or starting the vehicle.

Figure 5:
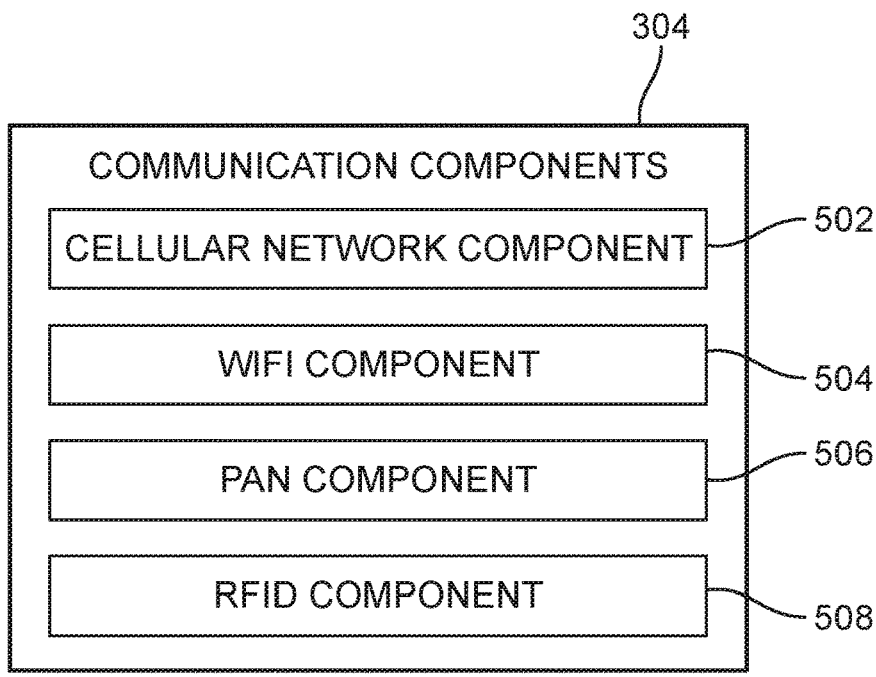
FIG. 5 is a schematic view of a set of communication components, according to an embodiment.

As seen in FIG. 5, communication components 304 can include a variety of different technologies for receiving and/or retrieving user customization profiles. These include, but are not limited to: cellular network component 502, WiFi component 504, personal area network (PAN) component 506 and RFID component 508.

Cellular network component 502 may comprise any hardware capable of communicating with other nodes in a cellular network. The components may be configured to communicate using one or more known cellular technologies such as Global System for Mobile Communications (GSM) and Code-Division Multiple Access (CDMA).

Wi-Fi component 504 may comprise any hardware capable of communicating with nodes in a wireless network using the IEEE 802.11 standards. In some cases, Wi-Fi component 504 may comprise a wireless network interface controller (WNIC).

PAN component 506 may comprise any hardware capable of communicating with nodes in a personal area network. PAN component 506 may be configured for specific protocols such as Bluetooth. RFID component 508 may comprise any hardware capable of receiving RFID signals.

In some embodiments, one or more of these components could be stand-alone hardware elements disposed in an onboard computer of vehicle 300. In other embodiments, one or more of these components may be integrated components within a System on a Chip (SoC).

Figure 6:
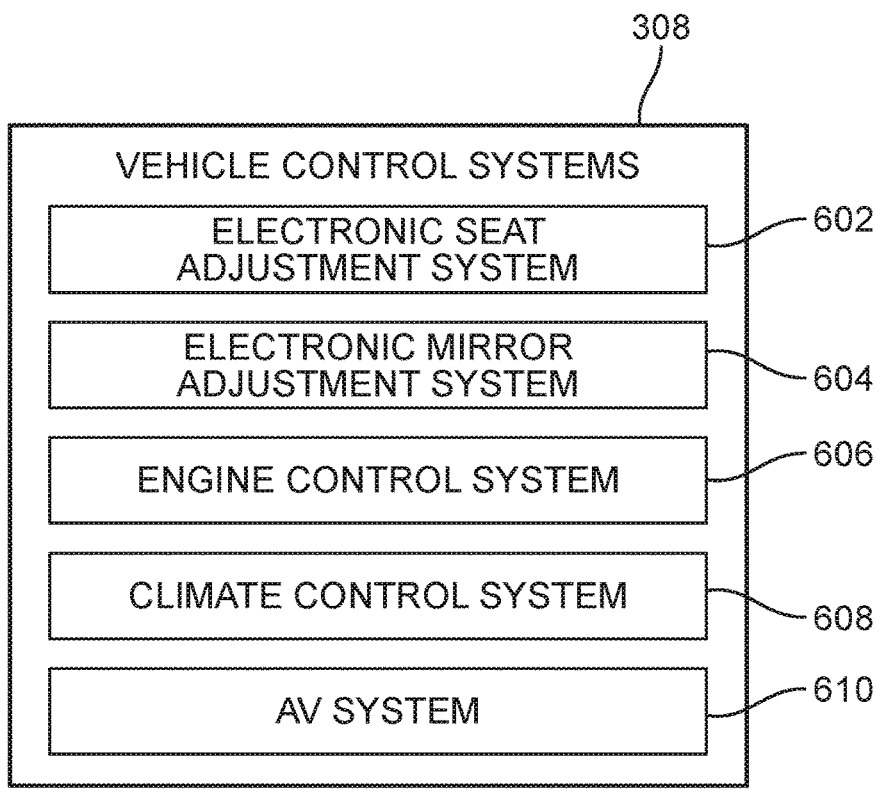
FIG. 6 is a schematic view of a set of vehicle control systems, according to an embodiment.

FIG. 6 is a schematic view of a set of vehicle control systems 308 that are used to automatically adjust one or more vehicle settings 310 (see FIG. 3). Referring to FIG. 6, vehicle control systems 308 may include an electronic seat adjustment system 602, an electronic mirror adjustment system 604, an engine control system 606, a climate control system 608 and an audio-visual (AV) system 610.

Electronic seat adjustment system 602 may comprise the electronic components and control systems used to change seat position, seat inclination, seat height and/or other settings. Upon receiving a user customization profile, customization management system 302 (FIG. 3) may pass customized seat settings to electronic seat adjustment system 602 for implementing those settings. In some cases, electronic seat adjustment system 602 can include provisions for mapping user seat settings to different types of vehicles, such as cars and trucks.

Electronic mirror adjustment system 604 may comprise the electronic components and control systems used to change the angular position of one or more mirrors in a vehicle. Upon receiving a user customization profile, customization management system 302 may pass customized mirror settings to electronic mirror adjustment system 604 for implementing those settings.

Engine control system 606 may comprise the control systems that monitor and control engine operation. Upon receiving a user customization profile, customization management system 302 may pass customized horsepower settings to engine control system 606 for implementing those settings.

Climate control system 608 may be operable to control the temperature, fan speed, AC On/Off, as well as other suitable climate control settings. In some cases, climate control system 608 could also include the electronic components and control systems used to adjust vent positions. Upon receiving a user customization profile, customization management system 302 may pass customized climate settings to climate control system 608 for implementing those settings.

AV system 610 may also receive customized audio-visual settings from customization management system 302. The customized audio-visual settings can be automatically set by AV system 610. For example, a user's preferred radio stations could be programmed by AV system 610 so that a user can simply press one of the pre-selected radio buttons to find a preferred station.

Figure 7:
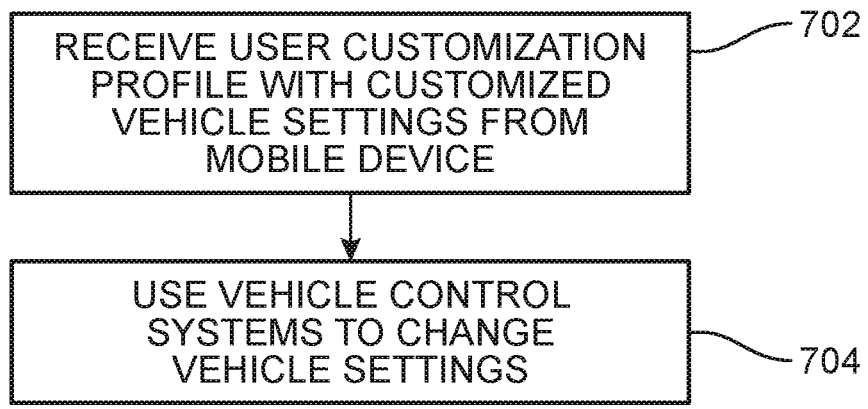
FIG. 7 is a schematic view of a process for implementing customized vehicle settings using a user customization profile from a mobile device.

FIG. 7 is a schematic view of an embodiment where a mobile device (such as a key fob or mobile phone) is used with a customization platform. In step 702, a user customization profile is received from a mobile device. As described above, the mobile device could be a key fob that transmits information using RFID and/or Bluetooth. Alternatively, the mobile device could be a mobile phone, such as a smartphone that communicates using Bluetooth and/or WiFi. Next, in step 704, one or more vehicle control systems are operated to change vehicle settings according to the customized settings associated with the user customization profile.

Customization profiles can be stored on a mobile device and within a customization management system using any kind of non-transitory computer readable mediums. These could include RAM, ROM or flash memory.

Figure 8:
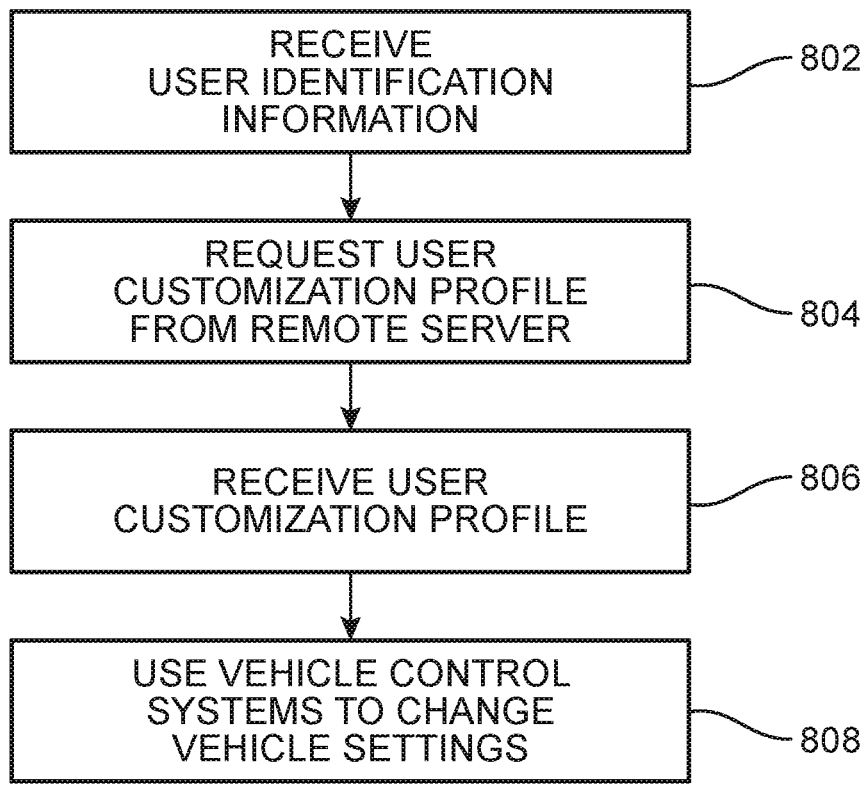
FIG. 8 is a schematic view of a process for implementing customized vehicle settings by retrieving a user customization profile from a remote server.

FIG. 8 is a schematic view of an embodiment where a user customization profile is retrieved from a remote server. In step 802, user identification information is received. User identification information could include credentials such as a username and/or password. In one embodiment, a user could enter a code into a keypad (such as a virtual keypad on an in-dash display). In another embodiment, a system could sense a biometric signature, such as a fingerprint, facial information and/or voice information.

Credentials and/or biometric signatures gathered in step 802 can then be passed as part of a request to a server in step 804. Specifically, the system may request the user customization profile associated with a given set of credentials (such as a passcode) and/or biometric signature.

In step 806, the user customization profile is received from the remote server in response to the request sent in step 804. Next, in step 808, one or more vehicle control systems are operated to change vehicle settings according to the customized settings associated with the user customization profile.

Figure 9:
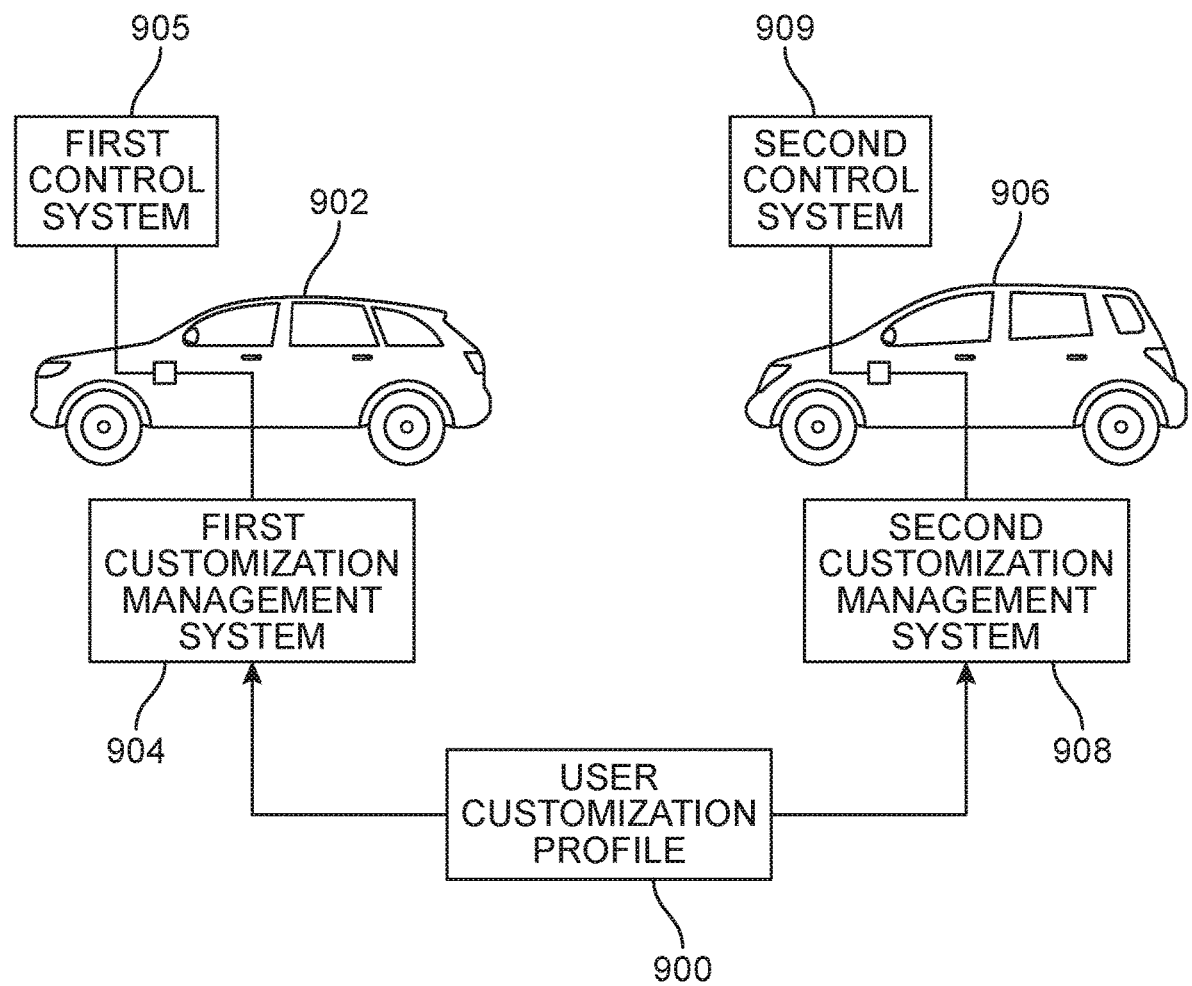
FIG. 9 is a schematic view of two different vehicles capable of receiving a user customization profile.

FIG. 9 is a schematic view of two different vehicles with different control systems that are configured to receive a common user customization profile 900. Specifically, first vehicle 902 comprises a first customization management system 904 and a first control system 905. Second vehicle 906 comprises a second customization management system 908 and a second control system 909. Here, first control system 905 and second control system 909 may comprise similar systems that implement similar vehicle settings. For example, both first control system 905 and second control system 909 could be electronic seat adjustment systems.

In FIG. 9, first vehicle 902 and second vehicle 906 could be different types of vehicles associated with different ownership and/or operational structures. For example, first vehicle 902 could be a user's own vehicle, while second vehicle 906 could be a rental car or a ride sharing vehicle. Alternatively, first vehicle 902 and second vehicle 906 could be different rental cars or different ride sharing cars.

Figure 10:
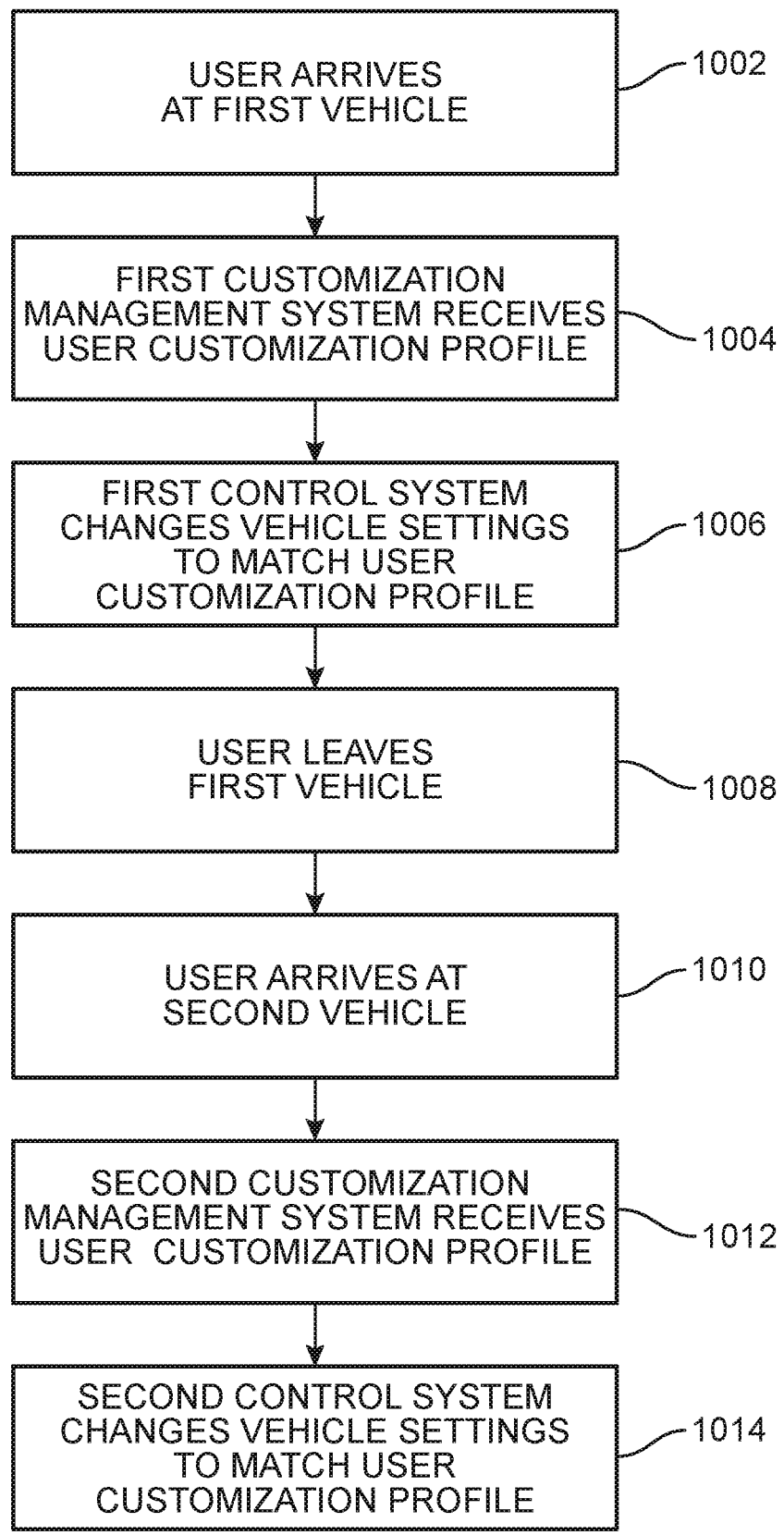
FIG. 10 is a schematic view of process for using components of FIG. 9.

FIG. 10 is a schematic view of a process for implementing customized settings in the two different vehicles depicted in FIG. 9. In a first step 1002, a user arrives at first vehicle 902. Next, in step 1004, first customization management system 904 receives a user customization profile associated with the user in first vehicle 902. This information could be received using any of the methods described above (for example, via key fob, smartphone or from the internet). Information about the relevant customized vehicle settings are then passed to first control system 905. First control system 905 then changes one or more vehicle settings to match the customized settings in the user customization profile in step 1006. The user then leaves first vehicle 902 in step 1008.

At a later time the same user arrives at second vehicle 906 in step 1010. Next, in step 1012, second customization management system 908 receives the user customization profile associated with the user (now in second vehicle 906). Second control system 909 then changes one or more vehicle settings to match the customized settings in the user customization profile in step 1014.

Although the embodiment of FIG. 10 depicts changing settings associated with a single vehicle system, the same methods could be used to change multiple vehicle settings simultaneously by passing information to multiple different vehicle control systems within the same vehicle.

In different embodiments, different methods can be used to create user customization profiles. In one embodiment, a customization management system within a vehicle can be configured to take a "snapshot" of all current vehicle settings for a user. Those settings may then be stored as part of a new user customization profile. Alternatively, a user could select customized settings from a software application (for example, a mobile application).

In other embodiments, vehicle settings could be set for multiple occupants of a vehicle when those occupants have an associated user customization profile. Thus, it may be appreciated that the embodiments are not limited to vehicle settings for a driver of the vehicle. For example, passengers in a taxi or other ride sharing vehicle could still have their preferences considered based on their user customization profile. It is contemplated that in some embodiments multiple occupants of a vehicle could have user customization profiles. In such embodiments, settings for two or more occupants could be set simultaneously so long as none of the settings are in conflict. For settings in conflict, it may be necessary to define a hierarchy. For example, the driver's settings may be set first, and any non-conflicting settings associated with profiles for other passengers could then be set.

In some embodiments, customized settings could be contextual. In some embodiments, customized settings for a given user could be different according to location. For example, in one embodiment, a user customization profile could have a first group of customized vehicle settings associated with a first location (for example, a mountain location) and a second group of customized vehicle settings associated with a second location (for example, a beach location). In some cases, the customization management system within a vehicle can automatically retrieve the current location and select the appropriate customized settings according to the current location of the vehicle.

It may be appreciated that the principles described herein for use with a vehicle could also be applied to other kinds of systems and devices, especially smart devices, having one or more customizable settings. As an example, a user customization profile could include customized home settings, such as a preferred thermostat temperature. Using the principles described herein, as a user enters a home a management system within the home may receive a user customization profile. If the profile includes a customized temperature setting, the management system may pass that information to a smart thermostat that automatically enacts that customized temperature setting. As another example, smart glasses could be interchangeable between users and may therefore utilize different customizable settings.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A vehicle customization platform for controlling a plurality of first vehicle settings in a first vehicle and for controlling a plurality of second vehicle settings in a second vehicle, comprising:
   a user customization profile associated with a user, the user customization profile including information about at least two groups of customized vehicle settings, wherein each group of customized vehicle settings includes two or more of seat position settings, mirror settings, horsepower settings, climate control settings, and audio system settings;
   wherein the at least two groups of customized vehicle settings includes a first group of customized vehicle settings associated with a first location of a vehicle and a second group of customized vehicle settings associated with a second location of a vehicle, the second location being different from the first location, wherein the first group of customized vehicle settings include two or more of seat position settings, mirror settings, horsepower settings, climate control settings, and audio system settings associated with the first location and wherein the second group of customized vehicle settings include two or more of seat position settings, mirror settings, horsepower settings, climate control settings, and audio system settings associated with the second location, and wherein the first group of customized vehicle settings are different from the second group of customized vehicle settings;
a first control system operable to change the plurality of first vehicle settings in the first vehicle, wherein the first control system is also operable to receive information about the at least two groups of customized vehicle settings;
a second control system that is operable to change the plurality of second vehicle settings in the second vehicle, wherein the second control system is also operable to receive information about the at least two groups of customized vehicle settings;
wherein when the first control system receives information about the at least two groups of customized vehicle settings, the first control system changes the plurality of first vehicle settings from a plurality of first initial settings to one of the first group of customized vehicle settings or the second group of customized vehicle settings;
wherein the selection of one of the first group of customized vehicle settings or the second group of customized vehicle settings is based on a current location of the first vehicle retrieved by the first control system and compared to the first location and the second location so that when the current location corresponds to the first location, the first group of customized vehicle settings are selected and when the current location corresponds to the second location, the second group of customized vehicle settings are selected; and
wherein when the second control system receives information about at least two groups of customized vehicle settings, the second control system changes the second vehicle settings from a second plurality of initial settings to one of the first group of customized vehicle settings or the second group of customized vehicle settings;
wherein the selection of one of the first group of customized vehicle settings or the second group of customized vehicle settings is based on a current location of the second vehicle retrieved by the second control system and compared to the first location and the second location so that when the current location corresponds to the first location, the first group of customized vehicle settings are selected and when the current location corresponds to the second location, the second group of customized vehicle settings are selected.

2. The vehicle customization platform according to claim 1, wherein the vehicle customization platform further comprises:
a first customization management system in the first vehicle operable to receive the user customization profile and send information about the at least two groups of customized vehicle settings to the first control system; and
a second customization management system in the second vehicle operable to receive the user customization profile and send information about the at least two groups of customized vehicle settings to the second control system.

3. The vehicle customization platform according to claim 1, wherein the user customization profile is received from an RFID device.

4. The vehicle customization platform according to claim 1, wherein the user customization profile is received over a wireless network.

5. The vehicle customization platform according to claim 1, wherein the user customization profile is retrieved from a remote server.

6. The vehicle customization platform according to claim 5, wherein the user customization profile is associated with biometric information for a driver.

7. The vehicle customization platform according to claim 1, wherein at least one customized vehicle setting associated with the first group of customized vehicle settings or the second group of customized vehicle settings is a vehicle seat position.

8. The vehicle customization platform according to claim 1, wherein at least one customized vehicle setting associated with the first group of customized vehicle settings or the second group of customized vehicle settings is a maximum horsepower setting.

9. The vehicle customization platform according to claim 1, wherein at least one customized vehicle setting associated with the first group of customized vehicle settings or the second group of customized vehicle settings is a climate setting.

10. The vehicle customization platform according to claim 1, wherein at least one customized vehicle setting associated with the first group of customized vehicle settings or the second group of customized vehicle settings is a mirror position setting.

11. The vehicle customization platform according to claim 1, wherein at least one customized vehicle setting associated with the first group of customized vehicle settings or the second group of customized vehicle settings is a radio station setting.

12. A vehicle customization platform for controlling vehicle settings in a vehicle, the system comprising:
a mobile device for storing a user customization profile, the user customization profile including information about at least two groups of customized vehicle settings, wherein each group of customized vehicle settings includes two or more of seat position settings, mirror settings, horsepower settings, climate control settings, and audio system settings;
wherein the at least two groups of customized vehicle settings includes a first group of customized vehicle settings associated with a first location of a vehicle and a second group of customized vehicle settings associated with a second location of a vehicle, the second location being different from the first location, wherein the first group of customized vehicle settings include two or more of seat position settings, mirror settings, horsepower settings, climate control settings, and audio system settings associated with the first location and wherein the second group of customized vehicle settings include two or more of seat position settings, mirror settings, horsepower settings, climate control settings, and audio system settings associated with the second location, and wherein the first group of customized vehicle settings are different from the second group of customized vehicle settings;
a vehicle control system disposed within the vehicle and operable to retrieve a current location of the vehicle and to automatically change a plurality of vehicle settings in the vehicle according to one of the first group of customized vehicle settings or the second group of customized vehicle settings; and a customization management system that is operable to receive the user customization profile from the mobile device and send information about one of the first group of customized vehicle settings or the second group of customized vehicle settings to the vehicle control system;

wherein the selection of one of the first group of customized vehicle settings or the second group of customized vehicle settings is based on the current location of the vehicle retrieved by the vehicle control system and compared to the first location and the second location so that when the current location corresponds to the first location, the first group of customized vehicle settings are selected and when the current location corresponds to the second location, the second group of customized vehicle settings are selected.

13. The vehicle customization platform according to claim 12, wherein mobile device is a key fob.

14. The vehicle customization platform according to claim 12, wherein the mobile device is a smartphone.

15. A method of changing vehicle settings in a first vehicle and a second vehicle using customized vehicle settings associated with a user customization profile, the first vehicle including a first vehicle control system operable to adjust at least one first vehicle settings in the first vehicle and the second vehicle including a second vehicle control system operable to adjust at least two second vehicle settings in the second vehicle, the method comprising the steps of:

receiving information about the user customization profile at the first vehicle control system, the user customization profile including information about at least two groups of customized vehicle settings, wherein each group of customized vehicle settings includes two or more of seat position settings, mirror settings, horsepower settings, climate control settings, and audio system settings;

wherein the at least two groups of customized vehicle settings includes a first group of customized vehicle settings associated with a first location of a vehicle and a second group of customized vehicle settings associated with a second location of a vehicle, the second location being different from the first location, wherein the first group of customized vehicle settings include two or more of seat position settings, mirror settings, horsepower settings, climate control settings, and audio system settings associated with the first location and wherein the second group of customized vehicle settings include two or more of seat position settings, mirror settings, horsepower settings, climate control settings, and audio system settings associated with the second location, and wherein the first group of customized vehicle settings are different from the second group of customized vehicle settings;

retrieving a current location of the first vehicle by the first control system;

changing the at least two first vehicle settings in the first vehicle to a customized vehicle setting from one of the first group of customized vehicle settings or the second group of customized vehicle settings;

wherein the selection of one of the first group of customized vehicle settings or the second group of customized vehicle settings is based on a current location of the first vehicle retrieved by the first control system and compared to the first location and the second location so that when the current location corresponds to the first location, the first group of customized vehicle settings are selected and when the current location corresponds to the second location, the second group of customized vehicle settings are selected;

receiving information about the user customization profile at the second vehicle control system;

retrieving a current location of the second vehicle by the second control system; and changing the at least two second vehicle settings in the second vehicle to a customized vehicle setting from one of the first group of customized vehicle settings or the second group of customized vehicle settings;

wherein the selection of one of the first group of customized vehicle settings or the second group of customized vehicle settings is based on a current location of the second vehicle retrieved by the second control system and compared to the first location and the second location so that when the current location corresponds to the first location, the first group of customized vehicle settings are selected and when the current location corresponds to the second location, the second group of customized vehicle settings are selected.

16. The method according to claim 15, wherein at least one customized vehicle setting associated with the first group of customized vehicle settings or the second group of customized vehicle settings is a vehicle seat position.

17. The method according to claim 15, wherein at least one customized vehicle setting associated with the first group of customized vehicle settings or the second group of customized vehicle settings is a maximum horsepower setting.

18. The method according to claim 15, wherein at least one customized vehicle setting associated with the first group of customized vehicle settings or the second group of customized vehicle settings is a climate setting.

19. The method according to claim 15, wherein at least one customized vehicle setting associated with the first group of customized vehicle settings or the second group of customized vehicle settings is a mirror position setting.

20. The method according to claim 15, wherein at least one customized vehicle setting associated with the first group of customized vehicle settings or the second group of customized vehicle settings is a radio station setting.

* * * * *